July 7, 1964 G. KIPER 3,139,806
STRUCTURE FOR OPERATING CAMERA SHUTTERS
Filed May 4, 1959 3 Sheets-Sheet 1

Fig.1

INVENTOR.
GERD KIPER
BY Michael S. Striker
Attorney

Fig. 2

July 7, 1964  G. KIPER  3,139,806
STRUCTURE FOR OPERATING CAMERA SHUTTERS
Filed May 4, 1959   3 Sheets-Sheet 3

INVENTOR.
GERD KIPER
BY

United States Patent Office 3,139,806
Patented July 7, 1964

1

3,139,806
STRUCTURE FOR OPERATING CAMERA SHUTTERS
Gerd Kiper, Unterhaching, near Munich, Germany, assignor to Agfa Aktiengesellschaft, Leverkusen-Bayerwerk, Germany
Filed May 4, 1959, Ser. No. 810,643
Claims priority, application Germany May 10, 1958
12 Claims. (Cl. 95—63)

The present invention relates to cameras.

More particularly, the present invention relates to camera shutters, especially of the between-the-lens type.

Conventional structures for operating shutters of this latter type suffer from several defects. Thus, conventional shutter operating structures of the above type operate with impact on the structure which moves the shutter leaves and a considerable amount of the available energy for moving the shutter leaves is wasted simply in stopping the movement of the parts. Also, the undesirable impacts provide vibrations which greatly reduce the dynamic efficiency of the shutter operation as compared to the static efficiency of operation thereof. Also, these impact forces strain the bearings as well as the points of motion transmission of the assembly.

Moreover, certain conventional, well-known shutters require relatively large masses to be moved, and as a result such shutters cannot be used where extremely short exposure times are required. Also, some known shutters require a pair of sets of shutter leaves one of which is the main shutter and the other of which forms an auxiliary shutter to prevent exposure of the film during cocking of the main shutter.

Furthermore, the highest quality shutters of conventional construction are extremely expensive since they require not only a large number of complex elements but also extreme precision in the manufacture and assembly of the elements so that they will cooperate property.

Thus, one of the primary objects of the present invention is to provide a shutter operating structure which is capable of moving the shutter leaves without any impact in the structure of the assembly so that there is no energy wasted in sudden, jerky stopping and starting of the movement of the parts particularly during a reversal in the direction of movement of the parts.

Another object of the present invention is to provide a shutter operating assembly with an exceedingly simple means for reliably holding the assembly in the cocked and uncocked positions thereof.

A further object of the present invention is to provide a shutter operating assembly with a simple, efficient structure for cocking the shutter.

It is also an important object of the present invention to provide a shutter driving structure which is capable of moving through predetermined distances when the shutter is closed as well as when it is open without operating the shutter blades, while at the same time operating without impact, so that the best possible use may be made of the available energy and so that springs, for example, which are used to provide the energy may be smaller than conventional springs used for this purpose and may be tensioned to a lesser degree than is conventional.

With the above objects in view the present invention includes in a camera a support means and a plurality of shutter leaves carried by the support means for movement between shutter closing and shutter opening positions. A ring means is turnably carried by the support means and operatively connected with the shutter leaves

2 for moving the latter between the said positions thereof, this ring having an open end position where the shutter leaves are in their shutter opening position and a closed end position where the shutter leaves are in their shutter closing position. A rotary drive means is carried by the support means and cooperates with the ring means to move the latter between its end positions, and this rotary drive means directly engages the ring means and gradually starts and stops the movement of the ring means in both directions of turning thereof so that the shutter operating structure of the invention operates entirely without impact to stop and start the movement of the parts.

The novel features which are considered as characteristic for the invention are set forth in particular in the appended claims. The invention itself, however, both as to its construction and its method of operating, together with additional objects and advantages thereof, will be best understood from the following description of specific embodiments when read in connection with the accompanying drawings, in which:

Figure 1:
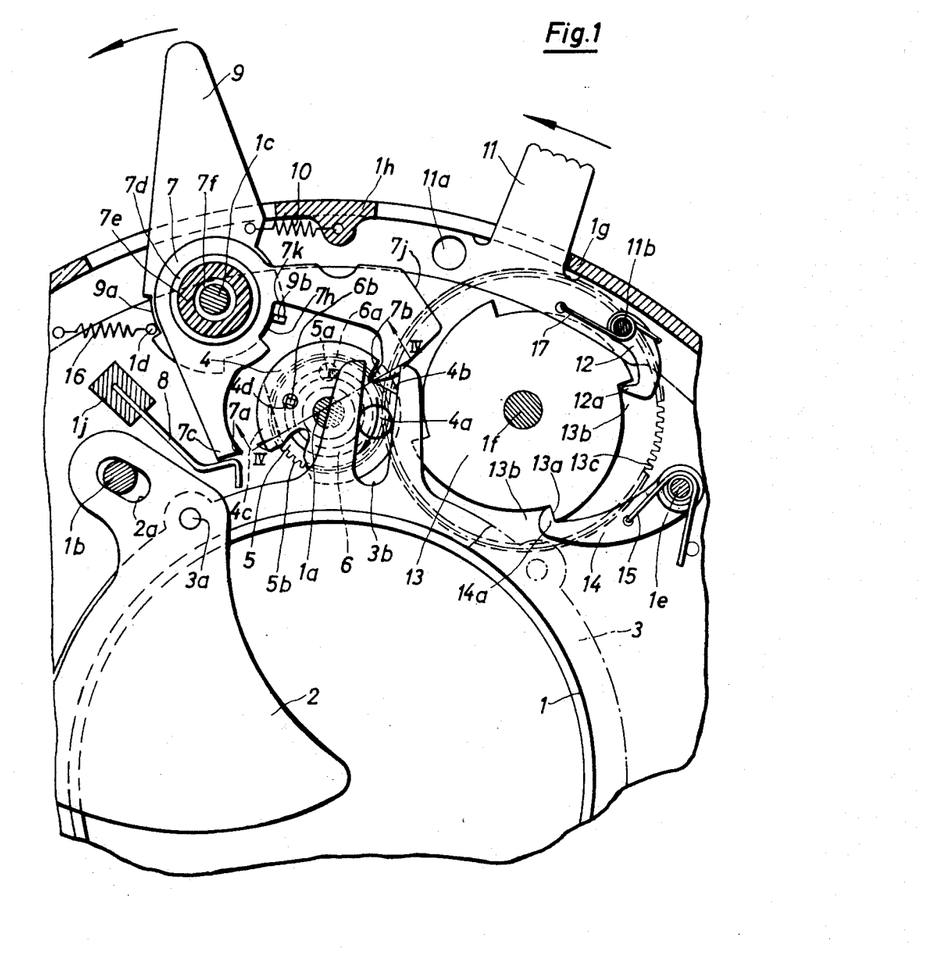
FIG. 1 is a fragmentary, partly sectional, elevational view of a shutter operating structure according to the present invention in closed position.

Referring now to FIG. 1, the shutter illustrated therein includes a plurality of conventional shutter leaves 2, only one of which is illustrated for the sake of clarity. The housing 1 forms a support means for carrying the shutter leaves 2 so as to support the latter for movement between shutter opening and shutter closing positions. This housing 1 forms part of the housing of an objective assembly, and the housing includes an annular wall located in a plane normal to the optical axis and fixedly carrying a plurality of pins 1b distributed uniformly around the optical axis, equal in number to the number of shutter leaves, and extending through the slots 2a of the latter, so as to form pin-and-slot connections supporting the shutter leaves for movement in a manner well known for iris shutters between shutter closing and shutter opening positions, the leaf 2 being shown in FIG. 1 in its shutter closing position.

The annular housing 1 also forms a support means for a shutter-operating ring means 3 which is in the form of a ring turnably supported by an inner annular wall of the housing 1. The ring means 3 is pivotally connected at 3a to the several shutter leaves 2, respectively, and the ring means 3 is shown in FIG. 1 in its closed end position where the shutter leaves 2 are in a position closing the shutter. The ring 3 is turntable in a counter-clockwise direction, as viewed in FIG. 1, from the closed end position thereof illustrated in FIG. 1 to an open end position where the several shutter blades 2 are displaced to their position opening the shutter, and the ring 3 turnably oscillates back and forth between the closed and open end positions thereof during operation of the shutter. Thus, during each cycle of operations of the shutter the ring 3 will be moved from the closed end position thereof to the open end position thereof to open the shutter, and then after the shutter is maintained open for the time required for the particular exposure the ring 3 turns back to the position illustrated in FIG. 1 to again place the shutter in its closed position.

A rotary drive means 4 is turnably carried by the support means 1 and cooperates by direct engagement with the ring means 3 to turn the latter between its end positions. Thus, this rotary drive means 4 is in the form of an annular member turntably carried by a stationary pivot pin 1a which is fixedly carried by a wall of the support means 1, and this rotary drive means 4 includes the pin 4a which is fixed to the annular member which is turntably carried by the pin 1a and which is located in the slot 3b of the ring 3, so that through the pin-and-slot connection 4a, 3b, the rotary drive means 4 cooperates with the ring means 3 to turn the latter between its end positions. The slot 3b is straight and extends radially with respect to the axis of the ring 3, and the rotary drive means 4 always turns in a clockwise direction, as indicated by the arrow in FIG. 1, to turn the ring means 3 from its closed end position to its open end position and then back to its closed end position. It will be noted that with the structure of the invention the pin 4a cooperates directly with the ring 3, and there are no motion transmitting elements interposed between the rotary drive means 4 and the ring 3, so that these parts cooperate directly with each other. Thus, the mass of the moving parts is maintained in this way at a minimum.

A spring means 6 cooperates with the rotary drive means 4 to turn the latter, and this spring means 6 is in the form of a coil extending around the pin 1a and having one end 6a extending into an opening 5a of a gear 5 which is turnable on the pin 1a behind the rotary drive means 4, the other end 6b of the spring 6 extending into an opening 4d of the rotary drive means 4 so that when the spring 6 is tensioned it will drive the rotary drive means 4.

The annular member which together with the pin 4a forms the rotary drive means 4 is formed with a pair of cutouts 4b and 4c which are located at substantially diametrically opposed parts of the annular member and which are located in different planes perpendicular to the axis of the pin 1a so that the cutouts 4b and 4c are displaced with respect to each other axially along the axis of the pin 1a. Thus, as may be seen from FIG. 1 the cutout 4b is in the plane of FIG. 1 while the cutout 4c is behind the plane of FIG. 1.

A double-acting pawl 7 turntably supported by the pivot pin 1c which is fixedly carried by the housing 1 cooperates with the rotary drive means 4, 4a to maintain the latter both in a shutter cocked position and in a shutter uncocked position. This double-acting pawl 7 has a pawl tooth 7b which cooperates with the cutout 4b in the manner illustrated in FIG. 1 to maintain the rotary drive means 4, 4a in the cocked position ready to operate the shutter as soon as the tooth 7b is moved out of the cutout 4b. The pawl 7 is directly carried by a sleeve 7d which surrounds a rubber sleeve 7e which in turn surrounds a sleeve 7f directly carried by the pin 1c, so that while the pawl 7 is turnable around the pin 1c it is also capable of yielding radially and resiliently with respect to the pin 1c, so that forces acting on the pawl 7 can be absorbed with the elastic sleeve 7e made of soft rubber or the like. The sleeves 7d and 7f are made of metal.

A clamp 1j is fixedly carried by the housing 1 and forms part of the support means therewith, and this clamp fixedly carries a leaf spring 8 which cooperates with the projecting portion 7c of the pawl 7 to maintain the latter both in the position illustrated in FIG. 1 where the tooth 7b is in the cutout 4b as well as in a second position where the pawl has released the rotary drive means 4, 4a to the spring 6 for operating the shutter. During the initial turning of the pawl 7 in a counterclockwise direction, as viewed in FIG. 1, by manipulation of the lever 9, the part 7c moves the lower end of the spring 8 away from the element 4 to increase the space between the elements 4 and 8 and then element 8 swings the pawl 7 around the pin 1c and holds the tooth 7a against the periphery of the element 4.

The pin 1c in addition to pivotally supporting the pawl 7 pivotally supports a manually turnable shutter release lever 9. A spring 10 is connected at one end to the lever 9 and at its opposite end to the portion 1h of the housing 1 to urge the lever 9 in a clockwise direction, as viewed in FIG. 1, to its rest position. The lever 9 is formed along its periphery with an arcuate notch 9a of a predetermined length in which a stationary pin 1d is located, this stationary pin being carried by the transverse wall of the housing 1, and this pin 1d cooperates with the ends of the notch 9a to limit the turning of the lever 9 in both directions. This lever 9 is also provided with a tongue 9b integral with the lever 9 and extending substantially parallel to the optical axis into a cutout 7h formed in the pawl 7, as indicated in FIG. 1. This pawl 7 also is provided with an edge portion 7j which is engaged by a pin 11a fixedly carried by a manually turnable tension ring 11 so that when the ring 11 is turned in a counterclockwise direction, as indicated by the arrow in FIG. 1, the pin 11a will ride along the edge 7j to turn the pawl 7 to the illustrated position so as to maintain the spring means 6 in its tensioned condition and the shutter cocked ready to be released. This tensioning ring 11 is turnably supported by the inner cylindrical surface of the outer wall of the housing 1, and the tensioning ring 11 pivotally carries a pawl 12 which is turnably supported by a pin 11b fixedly carried by the ring 11. This pawl 12 is acted upon by the wire spring 17 connected at one end to the ring 11, coiled around the pin 11b, and pressing with its opposite end on the pawl 12 so as to urge the latter in a clockwise direction around the pivot pin 11b, as viewed in FIG. 1, and this pawl 12 extends with its tooth 12a into one of the gaps 13b between the teeth of a ratchet wheel 13.

The ratchet wheel 13 is turnably carried by a stationary pivot pin 1f carried by the transverse wall of the housing 1, and this ratchet wheel 13 is fixedly connected coaxially to a gear 13c which thus turns with the ratchet 13 on the pivot pin 1f. The gear 13c meshes with the teeth 5b of the gear 5 which is turnable on the pin 1a and to which one end of the spring 6 is connected, as described above.

In order to prevent the ratchet wheel 13 and gear 13c from being turned by the tensioned spring 6, a second pawl 14 cooperates with the teeth 13a of the ratchet wheel 13, this pawl 14 being pivotally carried by a stationary pin 1e fixed to the transverse wall of the housing 1 and being urged by the spring 15 in a clockwise direction, as viewed in FIG. 1. The tooth 14a of the pawl 14 is shown in FIG. 1 in engagement with one of the teeth 13a of the ratchet wheel 13.

A spring 16 is connected at one end to the stop 1d which controls the extent of turning of the lever 9, as described above, and at its opposite end the spring 16 is connected to the tensioning ring 11 so as to urge the latter in a clockwise direction, as viewed in FIG. 1, to the illustrated rest position of the ring 11 where the outwardly extending, manually engageable radial projection of the ring 11 engages the portion 1g of the outer wall of the housing 1. This outer wall of the housing 1 is formed with an arcuate slot through which the manually engageable portion of the ring 11 extends, and this slot is limited at one end by the portion 1g of the housing 1 and at its opposite end by the portion 1h of the housing 1, so that the extent to which the operator can turn the ring 11 is determined by the portions 1g and 1h of the housing 1.

As has been indicated above the parts are shown in FIG. 1 in the position where the shutter is cocked ready to be released to make an exposure. In order to release the shutter to make the exposure, the operator turns the release lever 9 in the direction of the arrow shown in FIG. 1 at the upper left thereof, and in this way the tongue 9b which is located in the cutout 7h, as pointed out above, turns upwardly, as viewed in FIG. 1, into engagement with the edge 7k of the double-acting pawl 7 so as to turn the latter also in the direction of the arrow shown at the upper left of FIG. 1. Thus, the tooth 7b starts to turn out of the cutout 4b of the rotary drive means 4, 4a. However, before the tooth 7b has moved entirely out of the cutout 4b so as to release the rotary drive means to the force of the tensioned spring 6, the projection 7c has moved to the right, as viewed in FIG. 1, beyond the crest of the substantially V-shaped free end of the leaf spring 8 so that upon moving over this crest the leaf spring 8 itself acts on the pawl 7 to throw the latter around the pin 1c in a counterclockwise direction, as viewed in FIG. 1, quite independently of the turning of the lever 9 by the operator. Thus, while the operator starts the movement of the tooth 7b out of the cutout 4b upon turning of the lever 9 to release the shutter, the actual releasing of the rotary drive means 4 is beyond the control of the operator and takes place by the action of the spring 8, so that the operation of the shutter is not influenced by the manner in which the operator manipulates the lever 9.

Figure 3:
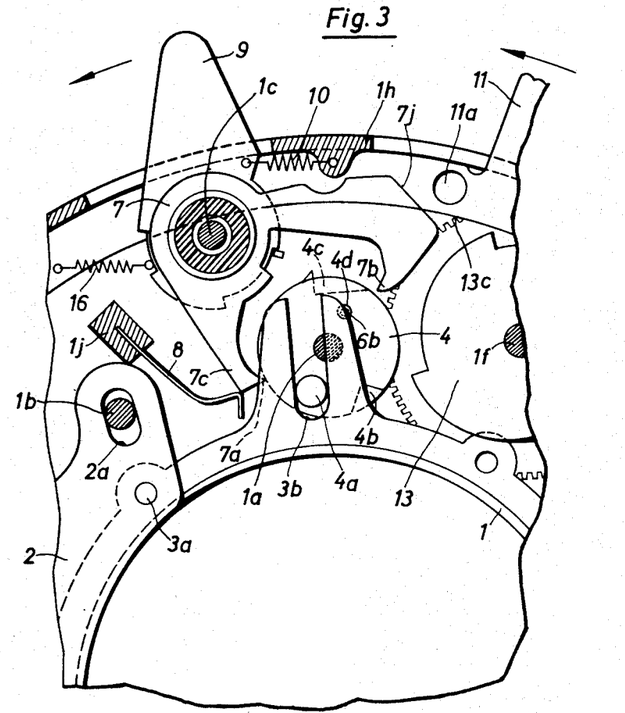
FIG. 3 is the shutter operating structure of FIG. 1 in open position.
Figure 4:
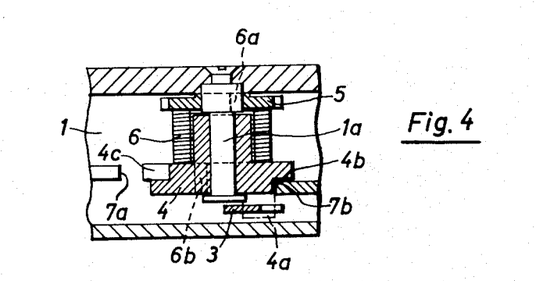
FIG. 4 is a sectional view of the rotary driving means according to FIGS. 1 and 3.

Once the tooth 7b has been moved in this way out of the cutout 4b, the rotary drive means turns in a clockwise direction, the spring 6 turning the rotary drive means 4, 4a in this direction at this time. The double-acting pawl 7 has a second pawl tooth 7a diametrically opposed to the tooth 7b on the opposite side of the rotary drive means from the tooth 7b, and the distance between the teeth 7a and 7b is only slightly greater than the outer diameter of the rotary drive means 4. As a result, the tooth 7a engages the outer periphery of the turning rotary drive means 4 as soon as the latter has been released to the spring 6 (FIG. 3). The tooth 7a is adapted to enter into the cutout 4c of the rotary drive means, and of course the projection 7b together with the tooth 7a are located in a plane perpendicular to the optical axis and axially displaced with respect to the plane in which the tooth 7b is located, so that the projection 7a is in the same plane as the cutout 4c while the projection 7b is in the the same plane as the cutout 4b (FIG. 4). As is apparent from FIG. 1, the turning of the rotary drive means by the spring means 6 displaces the cutout 4c beyond the tooth 7a when the latter is moved toward the rotary drive means by the spring 8, so that the tooth 7a cannot enter into the cutout 4c until the rotary drive means has turned through almost a complete revolution. Thus, when the rotary drive means 4 has turned through almost a complete revolution so that the cutout 4c has almost reached the position shown in FIG. 1, the spring 8 by its action on the double-acting pawl 7 will urge the tooth 7a into the cutout 4c so that the tooth 7a of the pawl 7 will now cooperate with the rotary drive means to maintain the latter in the uncocked position thereof, and it will be seen that the single spring 8 cooperates with the double-acting pawl to maintain the latter both in the illustrated cocked position of FIG. 1 as well as in the uncocked position where the tooth 7a is in the cutout 4c. The impact of the rotary drive means 4 on the projection 7c when the tooth 7a is in the cutout 4c is absorbed by the elastic sleeve 7e so that the forces which occur at this time are damped by the elastic sleeve 7e.

The rotation of the rotary drive means is transmitted to the ring means 3 through the pin-and-slot connection 3b, 4a as indicated above. The pin 4a together with the slot 3b form a crank slide, and the movement of the ring 3 through this pin and slot connection is substantially harmonic. Thus, the ring 3 is shown in FIG. 1 in its closed end position where the shutter leaves close the shutter. When the rotary drive means 4, 4a is released to the spring 6, the movement of the ring 3 is gradually started, and the speed of the movement of the ring 3 accelerates during the initial part of the movement of the ring 3, and then during the final portion of the movement of the ring 3 to its open end position the speed of movement decelerates until the ring 3 stops moving, the shutter leaves now being in the position where the shutter is open. In this open end position of the ring 3 a timing mechanism of known construction is set into operation in a known way so as to control the exposure time. During the return movement of the ring 3 to the position indicated in FIG. 1, brought about by continued rotation of the rotary drive means 4, 4a and in a clockwise direction, as indicated in FIG. 1, the movement of the ring 3 is again gradually started, the ring 3 accelerating and then decelerating as it approaches the closed end position shown in FIG. 1, until the ring 3 finally stops in the illustrated position. As a result of this deceleration of the ring 3 as it returns to its closed end position shown in FIG. 1, the ring 3 is brought to a stop without requiring any braking devices and also without creating any impact on the driving structure. Thus, when the tooth 7a enters into the cutout 4c in order to stop the turning of the rotary drive means after the latter turns through a single revolution, the ring 3 will have come to a stop of itself and there will be no impact forces created as a result of the stopping of the movement of the ring 3. The tooth 7a is located in the cutout 4c when the ring 3 is in its closed end position and as a result of the harmonic movement described above there is no recoiling of the rotary drive means by engagement with the tooth 7a and thus there is no recoil transmitted back to the ring 3 and the shutter leaves so that the latter remain in their shutter closing position and are influenced by the stopping of the rotary drive means. Inasmuch as the drive automatically stops in the closed end position of the ring 3, the spring means 6 requires only an extremely small residual tension when the rotary drive means is in the uncocked position of the shutter, this residual tension being only sufficient to guarantee the driving of the shutter through a complete cycle from closed to open and then back to closed position.

The parts are now in the uncocked position of the shutter, and the pawl 7 overlaps the tensioning ring 11 with the edge 7j located in the path of turning movement of the pin 11a when the tensioning ring 11 is manually turned by the operator. Thus, in order to cock the shutter the operator turns the ring 11 in the direction of the arrow shown at the upper right of FIG. 1, and the pin 11a engages the edge 7j of the pawl 7 to turn the latter in clockwise direction around the pin 1c. In this way the pawl 7 is moved from the shutter uncocked position thereof to the shutter cocked position thereof. During the movement of the tooth 7a out of the cutout 4c the tooth 7b moves into the cutout 4b and thus secures the rotary drive means 4 against being driven by the spring 6 which is being tensioned at this time. The spring 8 now cooperates with the projection 7c to hold the pawl 7 in the shutter cocked position thereof shown in FIG. 1.

During turning of the ring 11 in the tensioning direction, the pawl 12 cooperates with the ratchet wheel 13 to turn the latter and the gear 13c therewith in a counterclockwise direction, as viewed in FIG. 1, and the gear 13c by meshing with the teeth 5b of the gear 5 turns the latter in the same direction that the rotary drive means 4 turns during the driving of the shutter, so that the spring 6 is tensioned by being turned in the same direction that the rotary drive means 4 turns during driving of the shutter. The transmission ratio between the gear 13c and the gear 5 is such that when the ratchet wheel has been turned through an angular distance corresponding to the distance between two succeeding teeth 13a of the ratchet wheel 13, the gear 5 will have been turned through a full revolution in order to fully tension the spring 6, and it will be noted that at this time the pawl 14 will have engaged the next tooth of the ratchet wheel 13 to prevent the latter from being turned by the tensioned spring 6. Thus, it will be seen that in the illustrated example the ratchet wheel 13 has four teeth 13a spaced 90° from each other, and by the time the manually engageable projection of the tensioning ring 11 has reached the portion 1h of the housing 1, the pawl 12 will have turned the ratchet wheel 13 through slightly more than 90° so as to place the tooth 14a of the pawl 14 in a position to engage the next tooth 13a to prevent the pawl 13 and the gears 13c and 5 therewith from being turned by the tensioned spring 6. Upon release of the tensioning ring 11, the spring 16 returns it to the illustrated position and the pawl 12 engages the next following tooth 13a preparatory to repeating the above-described operations when the shutter is again cocked.

With the above-described structure, when the rotary drive means 4, 4a is in the position illustrated in FIG. 1 the pin 4a will be substantially in its rightmost circumferential end position where its only component of movement extends downwardly, as viewed in FIG. 1, so that there are substantially no lateral components of movement tending to turn the ring 3, and thus at this moment there is a limited amount of possible turning of the rotary drive means without turning of the ring 3, and the same is of course true when the pin 4a is in its leftmost circumferential end position. In the latter position the pin 4a will have substantially only an upwardly directed component and there will be no component of movement directed toward the right, so that in the leftmost position of the pin 4a this pin 4a will also have a limited amount of movement without transmitting any turning movement of the rotary drive means to the ring 3. Free turning of the rotary drive means without turning of the ring 3 when the latter is in its closed end position as well as in its open end position is highly desirable since this enables the structure to have sufficient opportunity for the double-acting pawl to cooperate with the rotary drive means and when the ring 3 is in its open end position a limited amount of free turning of the rotary drive means with respect to the ring gives an opportunity for the energizing of the timing mechanism. The embodiment of the invention which is illustrated in FIG. 2 is especially designed to provide a considerably greater amount of free turning of the rotary drive means without turning of the ring 3 when the ring 3 is in both of its end positions.

Figure 2:
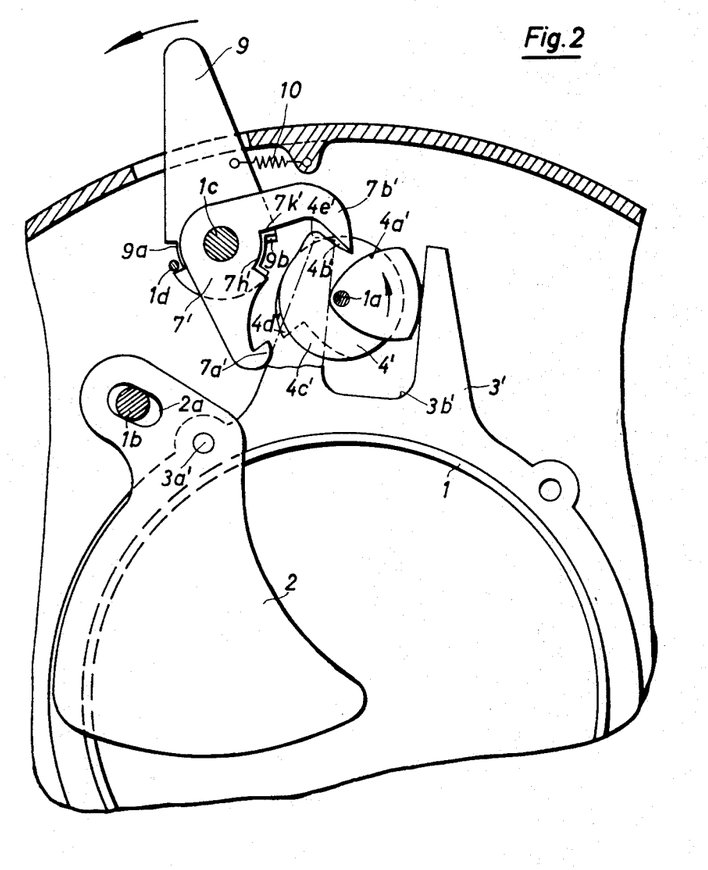
FIG. 2 is a fragmentary view of another embodiment of a shutter operating structure according to the present invention.

Referring to FIG. 2, it will be seen that the ring 3' is substantially identical with the ring 3 of FIG. 1, the only difference being that the slot 3'b is wider than the slot 3b. The rotary drive means 4' of FIG. 2 is also carried by a pivot pin 1a for turning movement, and this rotary drive means 4' turns in the opposite direction of the rotary drive means 4 of FIG. 1. This rotary drive means 4a is driven in the same way as the rotary drive means 4 through a tensioned spring which can be tensioned with the same structure as that shown in FIG. 1 and described above, the only difference being that the drive spring is tensioned in the opposite direction and the ratchet structure is reversed so that the tensioning ring will be turned in a direction opposite to that indicated in FIG. 1 in order to tension the drive spring in an opposite direction so as to urge the rotary drive means 4' in the counterclockwise direction illustrated in FIG. 2. The embodiment of FIG. 2 also includes a double-acting pawl 7' which is similar to the double-acting pawl 7 of FIG. 1 and which is also carried by the stationary pivot pin 1c. FIG. 2 shows a shutter release lever 9 identical with that of FIG. 1 and cooperating in the same way with the spring 10 and the stop 1d, this lever 9 having a projection 9b located in a cutout 7h' of the pawl 7' and cooperating with the edge 7k' in the manner described above for moving the pawl 7' to the position where it releases the rotary drive means 4' to the tensioned spring in order to actuate the shutter. In the illustrated cocked position of the shutter controlling elements of FIG. 2, the tooth 7b' of the double acting pawl 7' is located in the cutout 4b' of the rotary drive means 4' to prevent operation of the shutter. The double-acting pawl 7' also has a second tooth 7a' which cooperates with the cutout 4c', this latter cutout and the tooth 7a' being located in a plane different from the cutout 4b' and the tooth 7b'. The tooth 7a' when it is in the cutout 4c' cooperates with the rotary drive means 4' to maintain the latter in the uncocked position where the shutter has returned to its closed position but is not cocked.

In order to release the shutter, the operator turns the lever 9 in the direction of the arrow shown at the top of FIG. 2, and this will cause the projection 9b to engage the edge 7k' so as to turn the tooth 7b' out of the cutout 4b' and thus release the rotary drive means 4' in order to turn the shutter operating ring 3'. With the embodiment of FIG. 2 there is no element which corresponds to the spring 8 of FIG. 1. Once the tooth 7b' is out of the cutout 4b', the rotary drive means 4' turns in a counterclockwise direction, as viewed in FIG. 2, and while the tooth 7a' is close to the outer periphery of the rotary drive means 4', it cannot enter into the cutout 4c' until the rotary drive means 4' has turned through almost a revolution. When the rotary drive means 4' approaches the end of a complete revolution, a projection 4e' of the rotary drive means 4' will engage the tooth 7b' to turn the double-acting pawl 7' in a counterclockwise direction, as viewed in FIG. 2, around the pivot pin 1C, and thus cause the tooth 7a' to enter into the cutout 4c' so as to engage the rotary drive means 4' and maintain the latter in the uncocked position of the shutter. In this position of the parts the drive spring will have turned the rotary drive means 4' beyond the position where the projection 4e' engages the outer tip of the tooth 7b' and almost up to the position shown in FIG. 2, so that the tooth 7a' is now in engagement with the end portion 4d' of the cutout 4c to retain the rotary drive means in the uncocked position. It will be noted that in the position of the parts shown in FIG. 2, where the shutter is cocked, the rotary drive means 4' has turned slightly beyond the position where the part 4d' is aligned with the tooth 7a'.

Instead of a pin 4a of circular cross section, as indicated in FIG. 1, the rotary drive means 4' has a projecting pin 4a' extending into the cutout or slot 3b' to cooperate with the ring 3' to turn the latter. Thus the pin-and-slot connection of FIG. 2 is formed by the slot 3b' and the pin 4a' which is of a special configuration. This pin 4a' is of a non-circular peripheral configuration and the periphery of the pin 4a' is made up of a plurality of arcuate peripheral portions which are convex and which have such a relationship with respect to each other that all possible pairs of parallel tangents to the periphery of the pin 4a' are located equidistant from each other. In the illustrated example the pin 4a' has the peripheral configuration of an equilateral triangle having identical arcuate convex sides, as illustrated in FIG. 2. This configuration of the pin 4a' provides the rotary drive means 4' with considerable free turning movement when the ring 3' is in both of its end positions without turning of the ring 3'.

The position of the cutouts 4b' and 4c' with respect to each other and with respect to the pin 4a' is such that upon release of the rotary drive means 4' the latter will turn through a given angle without turning or transmitting any movement to the ring 3' so that the rotary drive means 4' will gain a certain amount of momentum before it starts to turn the ring means 3'. At the end of the operation of the shutter prior to engagement of the tooth 7a' with the portion 4d' of the rotary drive means 4' to stop the turning of the latter, the rotary drive means also will have a predetermined angular turning movement without turning of the ring means 3' which will already have reached its closed end position illustrated in FIG. 2. The rotary drive means 4' can turn at this time through a predetermined angle without turning the ring means 3' under the influence of the tensioned drive spring. When the tensioning ring is turned by the operator in a clockwise direction, as illustrated in FIG. 2, a projection of this tensioning ring, which ring is identical with that of FIG. 1 except that it turns in an opposite direction, as indicated above, will engage the top edge of the double-acting pawl 7', at a portion of this top edge directly opposite the edge 7k' of the pawl 7' to turn the pawl 7' in a clockwise direction, as viewed in FIG. 2, toward the position of the pawl 7' illustrated in FIG. 2. This projection will engage the top edge of the pawl 7' which is inclined upwardly to the right, as viewed in FIG. 2, to turn the pawl 7' in order to introduce the projection 7b' into the cutout 4b', and this will of course cause the projection 7a' to move out of the cutout 4c'. As the projection 7a' moves out of the cutout 4c', the rotary drive means 4' will turn slightly under the action of the tensioned drive spring, and this turning will be very slight and will continue only until the projection 7b' in the cutout 4b' has the position illustrated in FIG. 2 preventing further turning of the rotary drive means 4' until the operator actuates the shutter release lever 9. The pawl 7' may have an elastic mounting similar to that of the pawl 7 of FIG. 1 in order to damp any shocks which occur during engagement between the pawl 7' and the rotary drive means 4'.

Assuming, for example, that the ring 3' turns through 12° when moving between its end positions, then with the construction of FIG. 2 the ring 3' will be turned from one to the other of its end positions while the rotary drive means 4' turns through an angle of 108°, and during the next following 60° of rotation of the rotary drive means 4' the ring 3' will remain stationary. Then the ring 3' is returned to its starting position during the next 132° of turning of the rotary drive means, and during the the next succeeding 60° of turning of the rotary drive means the ring 3' will not be turned. Thus, with this arrangement the rotary drive means will have 60° of free turning in each of the end positions of the ring 3', and it will be noted that because of the convex peripheral edges of the pin 4a' the movement of the ring means 3' will in this case also be gradual at the starting and stopping of the movement of the ring 3'.

It is preferred with this construction to apply the turning of the rotary drive means through the 132° during the movement of the ring means 3' from its closed end position to its open end position, while the turning of the rotary drive means 4' through the 108° mentioned above preferably takes place during turning of the ring means 3' from its open end position to its closed end position. This arrangement provides the best possible operation of the shutter. With this arrangement both sides of a graph illustrating the shutter operation will have equal inclinations. Inasmuch as the rotary drive means 4' can turn freely through 60° in each of the end positions of the ring 3', there is plenty of time during each rotation of the rotary drive means 4' to set a timing mechanism into operation and this will be done when the ring 3' is in its open end position. The 60° of free turning available when the ring 3' is in its closed end position enables the rotary drive means to gain a certain momentum due to the kinetic energy imparted to the rotary drive means 4' at this time before the ring 3' actually starts to move, and this type of operation is of great advantage in a camera shutter.

As is apparent from the above description, with the structure of the invention there is no impact or shock-braking of the ring 3' so that the energy losses are maintained at a minimum and the drive spring 6 can have relatively small spring forces. Also, it will be noted that with the structure of the invention the rotary drive means cooperates with the ring means 3 or 3' without any impact or shocks occurring between these elements and without requiring the rotary drive means to turn first in one direction and then in another direction and also without requiring any auxiliary shutter construction. Because of the extremely small mass of the moving parts of the shutter construction of the invention, the shutter construction of the invention is particularly suitable for extremely short exposure times.

If desired, the rotary drive means 4 of FIG. 1 can be provided with a suitable camming portion similar to the camming portion 4e of the rotary drive means 4' of FIG. 2 for participating in the control of the movement of the double-acting pawl 7.

It will be understood that each of the elements described above, or two or more together, may also find a useful application in other types of cameras differing from the types described above.

While the invention has been illustrated and described as embodied in camera shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; and rotary drive means turnably carried by said support means and directly engaging said ring means for turning the latter from one of said end positions thereof to the other end position thereof and then back to said one end position during a revolution of said rotary drive means, said rotary drive means including a rotary member fixedly carrying a pin of circular cross section spaced from the axis of rotation of said rotary member, and a portion of said ring means being formed with a straight radial slot whose width equals the diameter of said pin, the latter being located in said slot and remaining therein at all times for moving said ring means from said one end position to said other position and then back to said one end position during a single revolution of said rotary member, said pin being located, when said ring means is in said end positions thereof, respectively in a pair of circumferential end positions where said pin provides substantially no movement of said ring means while continuing to turn through said single revolution with said rotary member.

2. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof, said ring means being formed with a straight radial slot; rotary drive means turnably carried by said support means and directly engaging said ring means for turning the latter from one of said end positions thereof to the other end position thereof and then back to said one end position during a single revolution of said rotary drive means, said rotary drive means including a rotary member which turns through said single revolution and a pin fixed eccentrically to said rotary member for rotation therewith and located at all times in said slot in sliding engagement with opposite sides thereof, said pin being located, when said ring means is in said end positions thereof, respectively in a pair of circumferential end positions in which said pin provides substantially no movement of said ring means while said pin continues to turn with said rotary member through said single revolution; spring means operatively connected with said rotary drive means for turning the latter; a first gear turnably carried by said support means and cooperating with said spring means for tensioning the latter when said first gear turns in the same direction that said rotary drive means turns during driving of said ring means; a second gear meshing with said first gear and also turnably carried by said support means; a ratchet wheel coaxially connected with said second gear for turning movement therewith; a pawl cooperating with said ratchet wheel for turning the latter and said second gear therewith; and a manually turnable tensioning ring turnably carried by said support means and carrying said pawl so that when the operator turns said tensioning ring said pawl will cooperate with said ratchet wheel to turn said second gear and through the latter said first gear for tensioning said spring means.

3. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof, said ring means being formed with a straight radial slot; rotary drive means turnably carried by said support means and directly engaging said ring means for turning the latter from one of said end positions thereof to the other end position thereof and then back to said one end position during a single revolution of said rotary drive means, said rotary drive means including a rotary member which turns through said single revolution and a pin fixed eccentrically to said rotary member for rotation therewith and located at all times in said slot in sliding engagement with opposite sides thereof, said pin being located, when said ring means is in said end positions thereof, respectively in a pair of circumferential end positions in which said pin provides substantially no movement of said ring means while said pin continues to turn with said rotary member through said single revolution; spring means operatively connected with said rotary drive means for turning the latter; a first gear turnably carried by said support means and cooperating with said spring means for tensioning the latter when said first gear turns in the same direction that said rotary drive means turns during driving of said ring means; a second gear meshing with said first gear and also turnably carried by said support means; a ratchet wheel coaxially connected with said second gear for turning movement therewith; a pawl cooperating with said ratchet wheel for turning the latter and said second gear therewith; a manually turnable tensioning ring turnably carried by said support means and carrying said pawl so that when the operator turns said tensioning ring said pawl will cooperate with said ratchet wheel to turn said second gear and through the latter said first gear for tensioning said spring means; and a second pawl carried by said support means and cooperating with said ratchet wheel for preventing turning of the latter and said gears by the tensioned spring means.

4. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof, said ring means being formed with a straight radial slot; rotary drive means turnably carried by said support means and directly engaging said ring means for turning the latter from one of said end positions thereof to the other end position thereof and then back to said one end position during a single revolution of said rotary drive means, said rotary drive means including a rotary member which turns through said single revolution and a pin fixed eccentrically to said rotary member for rotation therewith and located at all times in said slot in sliding engagement with opposite sides thereof, said pin being located, when said ring means is in said end positions thereof, respectively in a pair of circumferential end positions in which said pin provides substantially no movement of said ring means while said pin continues to turn with said rotary member through said single revolution; and double-acting pawl means cooperating with said rotary drive means for maintaining the latter in a cocked position when said ring means is in said closed end position thereof preparatory to driving said ring means and in an uncocked position when said ring means also is in said closed end position thereof at the end of a cycle of operation of the shutter leaves.

5. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; rotary drive means turnably carried by said support means and directly engaging said ring means for turning the latter from one of said end positions thereof to the other end position thereof and then back to said one end position during a revolution of said rotary drive means; double-acting pawl means cooperating with said rotary drive means for maintaining the latter in a cocked position when said ring means is in said closed end position thereof preparatory to driving said ring means and in an uncocked position when said ring means also is in said closed end position thereof at the end of a cycle of operation of the shutter leaves; and bearing means supporting said double acting pawl on said support means for turning movement around a predetermined axis and for yieldable resilient movement radially with respect to the latter axis.

6. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; rotary drive means turnably carried by said support means and directly engaging said ring means for turning the latter from one of said end positions thereof to the other end position thereof and then back to said one end position during a revolution of said rotary drive means; double-acting pawl means cooperating with said rotary drive means for maintaining the latter in a cocked position when said ring means is in said closed end position thereof preparatory to driving said ring means and in an uncocked position when said ring means also is in said closed end position thereof at the end of a cycle of operation of the shutter leaves; and a single spring means cooperating with said double-acting pawl for yieldably maintaining the latter in both of its positions where it cooperates with said rotary drive means to hold the latter in said cocked and uncocked positions thereof.

7. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof, said ring means being formed with a straight radial slot; rotary drive means turnably carried by said support means and directly engaging said ring means for turning the latter from one of said end positions thereof to the other end position thereof and then back to said one end position during a single revolution of said rotary drive means, said rotary drive means including a rotary member which turns through said single revolution and a pin fixed eccentrically to said rotary member for rotation therewith and located at all times in said slot in sliding engagement with opposite sides thereof, said pin being located, when said ring means is in said end positions thereof, respectively in a pair of circumferential end positions in which said pin provides substantially no movement of said ring means while said pin continues to turn with said rotary member through said single revolution; spring means cooperating with said rotary drive means for turning the latter; pawl means turnably carried by said support means and cooperating with said rotary drive means for holding the latter in a cocked position where the spring means is tensioned ready to turn the rotary drive means so that the latter will move said ring means; manually operable means carried by said support means and accessible to the operator for turning said pawl means away from said rotary drive means to release the latter; and tensioning means cooperating with said spring means for tensioning the same, said tensioning means also cooperating with said pawl for moving the latter back to the position where it holds said rotary drive means in the cocked position thereof.

8. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; and rotary drive means turnably carried by said support means and directly engaging said ring means for turning the latter from one of said end positions thereof to the other end position thereof and then back to said one end position during a revolution of said rotary drive means, the connection between said ring means and said rotary drive means including a portion of said ring means formed with a straight radial slot and an eccentric projection of said rotary drive means located at all times in said slot and engaging said ring means at opposite side edges of said slot simultaneously, said projection having a non-circular configuration including convexly curved edge portions providing sliding engagement between said projection and ring means in the slot of the latter without turning of said ring means during portions of each revolution of said rotary drive means when said projection is in a pair of circumferential end positions respectively locating said ring means in both of its end positions.

9. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; and rotary drive means turnably carried by said support means and directly engaging said ring means for turning the latter from one of said end positions thereof to the other end position thereof and then back to said one end position during a revolution of said rotary drive means, the connection between said ring means and said rotary drive means including a portion of said ring means formed with a straight radial slot and an eccentric projection of said rotary drive means located at all times in said slot and engaging said ring means at opposite side edges of said slot simultaneously, said projection having a non-circular configuration including convexly curved edge portions providing sliding engagement between said projection and ring means in the slot of the latter without turning of said ring means during portions of each revolution of said rotary drive means when said projection is in a pair of circumferential end positions respectively locating said ring means in both of its end positions and said projection providing gradual starting and stopping of said ring means in both directions of movement thereof.

10. In a camera, in combination, support means; a plurality of shutter leaves carried by said support means for movement between shutter opening and shutter closing position; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; and rotary drive means turnably carried by said support means and directly engaging said ring means for turning the latter from one of said end positions thereof to the other end position thereof and then back to said one end position during a revolution of said rotary drive means, and the connection between said rotary drive means and said ring means including a portion of the latter formed with an elongated slot and a projection of said rotary drive means located in said slot and simultaneously engaging opposite side edges thereof, said projection having a non-circular periphery composed of a plurality of curved edge portions the tangents to which form pairs of parallel tangents all of which are equidistant from each other.

11. In a camera, in combination, support means; a plurality of shutter leaves carried by said support means for movement between shutter opening and shutter closing position; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; and rotary drive means turnably carried by said support means and directly engaging said ring means for turning the latter from one of said end positions thereof to the other end position thereof and then back to said one end position during a revolution of said rotary drive means, the connection between said rotary drive means and ring means including a portion of the latter formed with an elongated slot and a projection of said rotary drive means located in said slot and simultaneously engaging opposite side edges thereof, said projection having the configuration of an equilateral triangle provided with identical arcuate convex sides.

12. In a camera, in combination, support means; a plurality of shutter leaves carried by said support means for movement between shutter opening and shutter closing positions; ring means operatively connected to said leaves for moving the latter between said positions thereof, said ring means being carried by said support means for rotary movement between an open end position placing said leaves in said shutter opening position thereof and a closed end position placing said leaves in said shutter closing position thereof; rotary drive means turnably carried by said support means and directly engaging said ring means for turning the latter from one of said end positions thereof to the other end position thereof and then back to said one end position during a revolution of said rotary drive means; and double-acting pawl means turnably carried by said support means and cooperating with said rotary drive means for releasably holding the latter in a cocked position when said ring means is in said closed end position thereof and in an uncocked position when said ring means also is in said closed end position thereof, said rotary drive means having a curved periphery cooperating with said double-acting pawl means for controlling at least part of the movement of the latter.

References Cited in the file of this patent

UNITED STATES PATENTS

| | | |
|---|---|---|
| 313,334 | Howell | Mar. 3, 1885 |
| 362,555 | Thomas et al. | May 10, 1887 |
| 436,404 | Dallmeyer | Sept. 16, 1890 |
| 975,464 | Schmid | Nov. 15, 1910 |
| 2,382,623 | Fuerst | Aug. 14, 1945 |
| 2,492,723 | Wilcox | Dec. 27, 1949 |
| 2,507,182 | Young | May 9, 1950 |